United States Patent [19]
Lenhart et al.

[11] 3,862,430
[45] Jan. 21, 1975

[54] ELECTRICAL DEMAND LIMITING SYSTEM

[75] Inventors: James Herbert Fuller Lenhart, Tucson, Ariz.; Purushottam Manilal Patel, Hudson Falls, N.Y.

[73] Assignee: Rist-Frost Associates, Glens Falls, N.Y.

[22] Filed: July 31, 1973

[21] Appl. No.: 384,169

[52] U.S. Cl.................................. 307/35, 307/62
[51] Int. Cl............................................. H02j 3/14
[58] Field of Search .......... 307/35, 125, 34, 38, 39, 307/62

[56] References Cited
UNITED STATES PATENTS
2,469,645    5/1949    Harper................................ 307/35

Primary Examiner—Robert K. Schaefer
Assistant Examiner—M. Ginsburg
Attorney, Agent, or Firm—Robert T. Tobin

[57] ABSTRACT

An electrical demand limiting system is disclosed in which a DC signal proportional to the total power demand averaged for a given interval of time is compared with a plurality of preselected demand limits. Each demand limit is a percentage of the total permissible power demand. A plurality of loads are sequentially switched from each of the demand set points over a predetermined time period.

29 Claims, 13 Drawing Figures

Fig. 1. Daily Demand Graph

Fig. 2A.

ELECTRICAL DEMAND LIMITING SYSTEM

BACKGROUND OF THE INVENTION

1. Field of the Invention

This invention relates, in general, to a power demand limiting system. More particularly, it relates to an electrical power demand limiting system in which the electrical power demand of a multi load consumer is limited by determining the instantaneous integrated power demand and shedding loads when the demand exceeds a permissible demand over a demand period. Different loads are shed in accordance with preselected set points which represent percentages of the permissible demand limit. The set points associated with each load are changed for each demand period so that the loads are not always shed in the same order.

Utilities generally bill large electrical consumers on a peak demand billing system in which the peak power demand is determined over a given time period. Typically the peak power demand is measured by the utility on a 15 or 30 minute interval. The utilities desire to supply even and predictable loads. To encourage the consumer not to make peak demands which are greatly in excess of this normal demands the utilities penalize the consumer for his peak demands. Typically, this is done by establishing a minimum demand which is, for example 75 percent of the highest peak demand during any measurement interval during a number of previous billing periods. The consumer must then pay for the minimum demand whether he uses it or not. Thus, it is financially advantageous for a consumer to avoid peaks so that he need only pay the lowest demand charge his system can tolerate. Additionally, with the present energy crisis, it is beneficial to all consumers if loads may be equalized to make the best use of energy and the available generation and transmission facilities.

It is therefore an object of this invention to provide a system for limiting the power demand peaks of a customer.

It is also an object of this invention to determine the integrated or averaged power demand of a system and determine from this value whether or not the consumer will exceed the predetermined demand level during the measuring time interval or demand period.

It is a further object to sequentially program the connection and disconnection of the consumer's various selected electrical loads to maintain the electrical power demand below the maximum permissible demand level in such a manner that the first load disconnected from the system during a prior time interval or damand period has a higher priority to remain connected during the next time interval.

SUMMARY OF THE INVENTION

The features and objectives of the present invention are achieved in a demand limiting system connected to a plurality of loads in which no predetermined priority is given to any load. Instead each load is advanced at the end of each demand period so that during a predetermined time period, for example, 2 or 3 hours, each load is advanced through various set points, each of which represents a percentage of the demand limit which if reached will result in the disconnection of that load.

The determination of whether or not any loads are to be disconnected to maintain the demand below the preset maximum is accomplished in several steps, the first of which is to determine what the electrical demand of the system is. This is accomplished by a power consumption measuring means which converts the instantaneous power consumption of the loads into a signal proportional thereto. In the preferred embodiment this is accomplished by measuring the power consumption and generating a pulsed output signal whose time period or duration is proportional to the total power consumption of the various loads during a fixed demand period. This pulsed output signal is then converted to a DC voltage signal whose voltage level is proportional to the instantaneous integrated or averaged power consumed by the various loads. This voltage signal is compared to a plurality of set points each representing a percentage of the predetermined demand limit. Each of these demand limits or set points is connected through a switching means to a plurality of load relays. If the power demand exceeds any of the predetermined set points, the load relay connected to that particular set point operates and the load is disconnected from the circuit in an attempt to maintain the power demand below the predetermined maximum. If the power demand continues to increase, this procedure is repeated at each successive set point, until all the preselected loads are disconnected from the system.

Two modes of operation and separate embodiments therefor are illustrated. In the first, the instantaneous demand is integrated over a predetermined time period. The outputs are scaled to, (in effect) cause a division by said measurement period. Thus, voltage signals will steadily increase and loads will only by disconnected near the end of said measurement period if the demand warrants. In the second emdodiment the integrated demand is divided by the time from the beginning of the predetermined time period up to the time of measurement, thereby resulting in a DC voltage which is an averaged demand. This will result in loads being disconnected whenever this averaged demand exceeds the permissible limit. Thus, if the first measurement at the beginning of the measurement period indicates excessive demand, one or more loads are immediately disconnected. In this mode it is possible that the DC voltage will then drop below the permissible limits at the set points. Thus, means are also provided to reconnect the loads, should this occur. These means for reconnection include a delay to avoid oscillations when the DC voltage varies small amounts close to a set point.

Also provided within the system is a means for switching the various loads to different set points on a predetermined time schedule. By this procedure, as an example, a load connected to an 80 percent set point and thus programmed to be disconnected from the circuit when 80 percent of the peak demand was reached may be switched to another set point and disconnected upon the occurrence of 100 percent of the peak demand. Similarly, each of the other loads are progressively advanced over a fixed or predetermined time period from 100 percent of the permissible demand up to and including 80 percent of the permissible demand.

BRIEF DESCRIPTION OF THE DRAWINGS

The invention, as well as its objects and features will be better understood by reference to the following detailed description of the preferred embodiment of this invention taken in conjunction with the accompanying drawings in which.

DESCRIPTION OF THE PREFERRED EMBODIMENT

Figure 1:
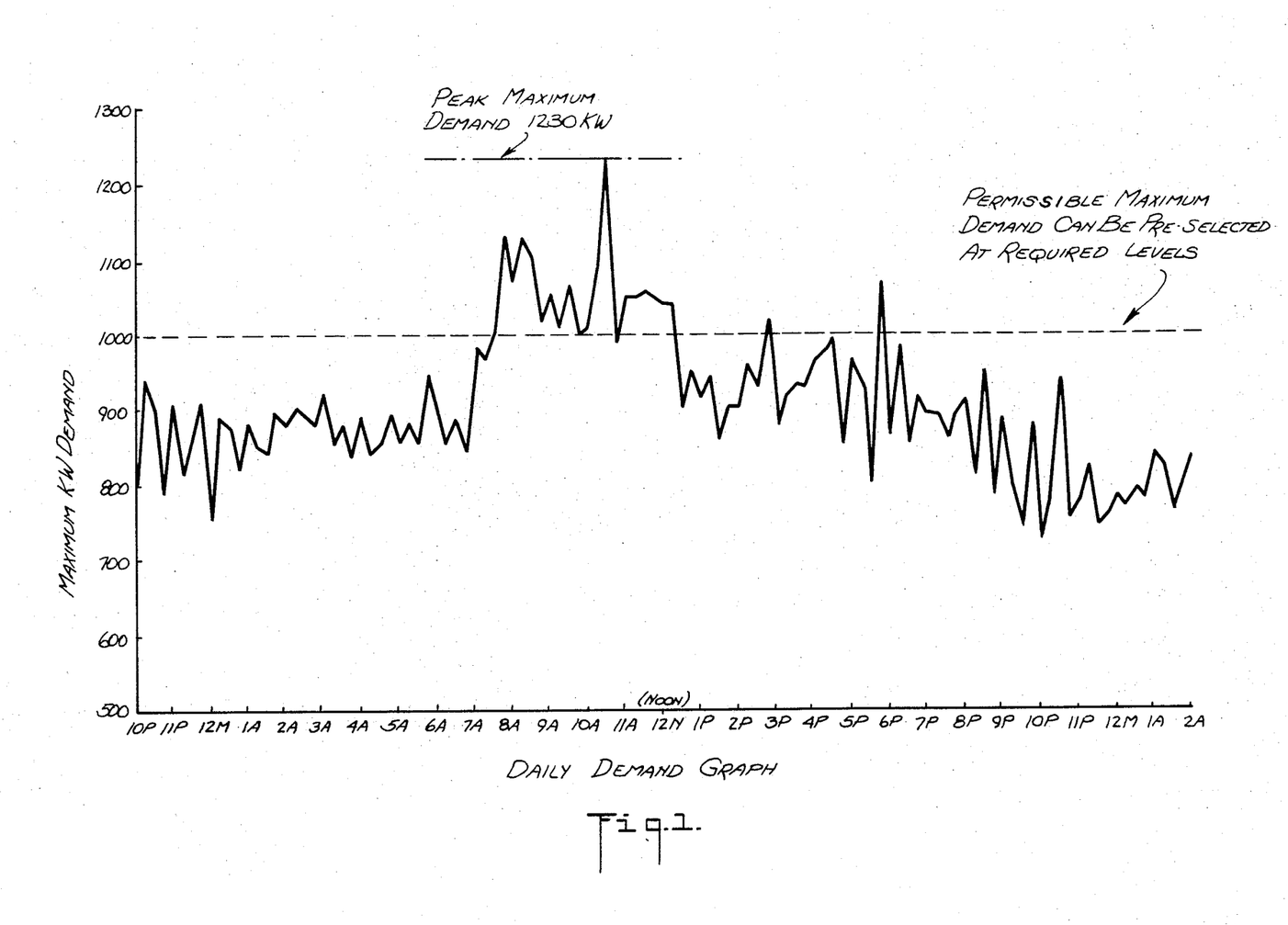
FIG. 1 represents a typical daily electrical power demand curve for a multiple load consumer.

As shown in FIG. 1 the magnitude of instantaneous electrical power demand of a typical multiple load consumer varies throughout the day and throughout the year. During the winter months the demand for electrical power for heating and lighting is obviously at a maximum. Further, in a typical building or complex of buildings used only during normal working hours, demand peaks may occur in the early morning hours when the building is "waking up" and heating, lighting and other electrical appliances are started at the same time. At other times during the day the demand may not be as great. The present invention controls this demand by programming the disconnection and connection of the multiple loads preventing sudden demand peaks above the established permissible maximum, which in FIG. 1 may be selected at 1,000 KW.

Figure 2:
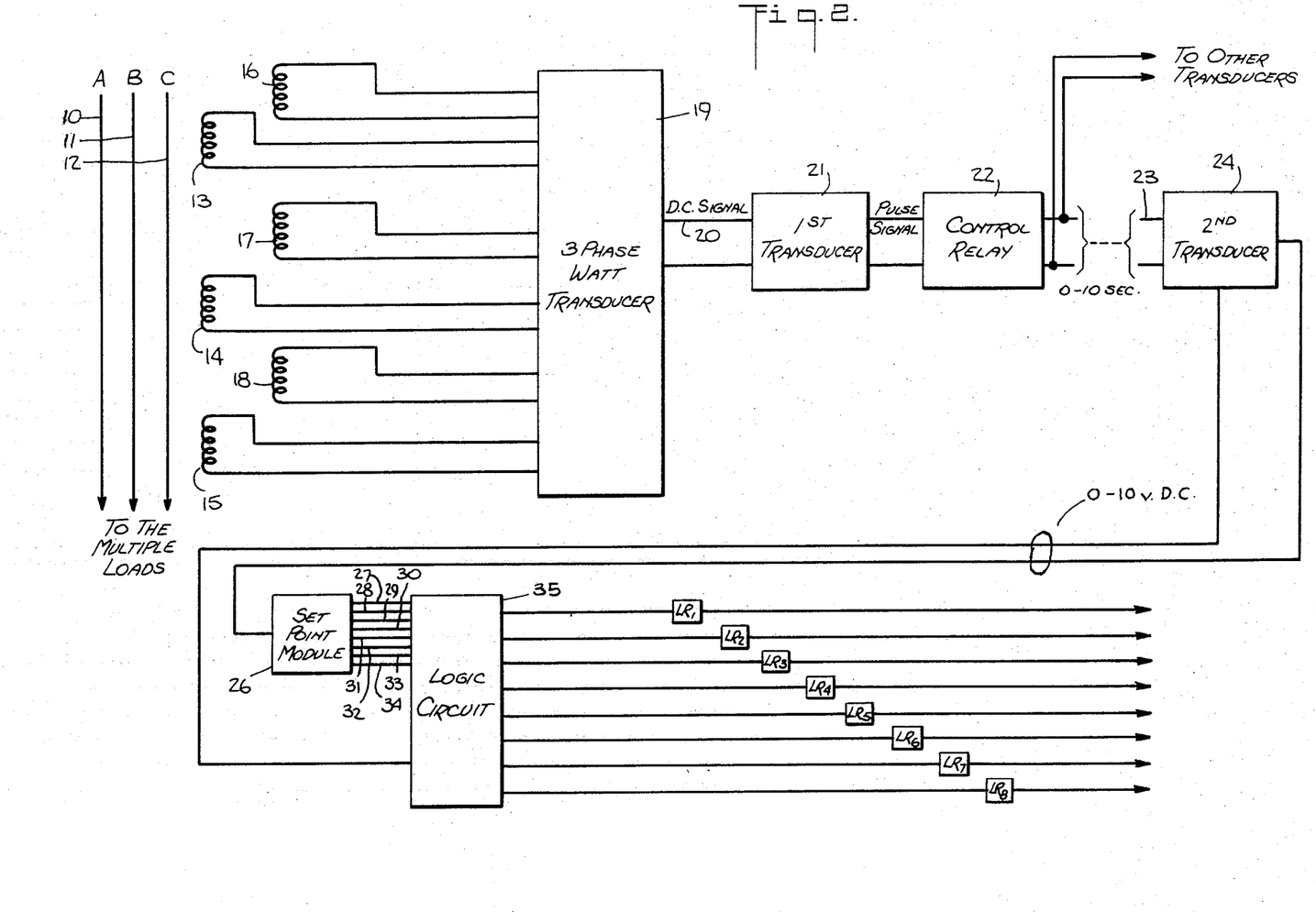
FIG. 2 is a block diagram of the preferred embodiment of the invention.

FIG. 2 illustrates a preferred embodiment of the invention. A three phase power supply bus 10, 11 and 12 has current transformers 13, 14 and 15 and voltage transformers 16, 17 and 18 connected to each of the three phases. It is to be understood that while the invention is described with a three phase electrical power system, it is equally applicable to a single phase power supply.

In order to operate the demand limiting system of this invention, it is first necessary to determine the real power demand of the loads. This initial signal may be obtained by many standard instruments such as the output signal from a utility meter or from the voltage and current transformers 13–18. In this manner, the total power supplied to the system through the three phases is thus measured. As shown in FIG. 2, a three phase watt transducer 19 is connected to the output of the secondary windings of all the voltage and current transformers 13–18. The three phase watt transducer 19 transforms the AC voltage and current signals into a direct current signal output from transducer 19 on line 20 whose magnitude is proportional to the instantaneous power consumed by the multiple loads of the consumer. This DC output signal (which, for example, may be a varying current) appears on line 20 and is fed as an input to the first transducer 21 which transforms the DC input signal into a pulsed output signal, the pulse length of which is proportional to the integral of the total power consumption of the installation. This signal is produced within the first transducer 21.

Figure 3:
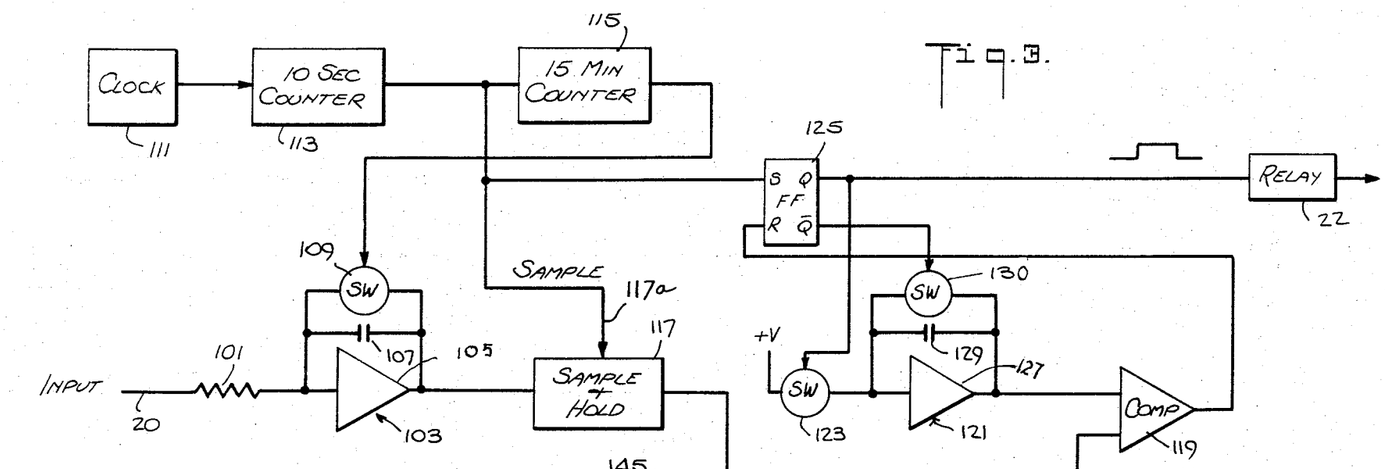
FIG. 3 is a block diagram of the first transducer circuit for transforming a DC signal representing the instantaneous power into a pulse duration signal whose time period represents the integrated power demand for a predetermined time period.

FIG. 3 shows in simplified form a circuit which may be used to perform the current to pulse length conversion of the first transducer 21. This converts the instantaneous KW analog signal to a pulse length proportional to the integrated kilowatt demand signal. The DC input signal on line 20 representing the instantaneous kilowatt demand is fed through a resistor 101 to an integrator 103 comprising an operational amplifier 105 and a capacitor 107 in its feedback path. Across the capacitor 107 a switch 109 may be connected and used to discharge the capacitor 107 at the end of the integration of the DC input signal. A clock oscillator 111 has its output connected to the input of a counter 113 which contains sufficient binary stages to provide an output every 10 seconds at the clock frequency input. The output of counter 113 is connected to a 15 minute counter 115 which provides an output every 15 minutes i.e., for every 90 input pulses from counter 113. Prior to the beginning of each 15 minute integration period switch 109 will be closed by an output signal from counter 115, thereby discharging capacitor 107. The integrator 103 will then begin integrating the DC input signal on line 20, which represents the instantaneous power consumption. The output of integrator 103 represents the time integral of the power consumption. The output of integrator 103 is connected to a sample and hold circuit 117 which obtains its sample input through lead 117a from the 10 second counter 113. Therefore every 10 seconds, in response to an output from counter 113, sample and hold circuit 117 will sample and hold the output voltage of integrator 103. This output of the sample and hold circuit 117 is provided as one input to a comparator 119. The second input to comparator 119 is from an integrator 121 whose input is connected through a switch 123 to a constant voltage source +V. The same 10 second counter output which causes the sample and hold circuit 117 to sample and hold the voltage output of integrator 103 is used to set a flip-flop circuit 125 having its Q output tied to the switch 123 causing it to close every 10 seconds and provide the fixed voltage +V as an input to integrator 121. Integrator 121 is comprised of an operational amplifier 127 with a capacitor 129 in its feedback path and a switch 130 across the capacitor 129. Switch 130 is tied to the $\overline{Q}$ output of flip-flop circuit 125 and thus it will be open when switch 123 is closed permitting integrator 121 to integrate the the constant voltage +V. Integrator 121 will continue to integrate until its output equals or exceeds the second input to comparator 119 at whichpoint a comparator 119 will provide an output to reset flip-flop 125. This will open switch 123 and close switch 130 discharging capacitor 129 in preparation for the next 10 second sample.

The pulse length output is provided from the Q output of flip-flop 125 to the relay 22. Since the pulse starts at the beginning of the integration and ends when the output voltage of integrator 121 reaches a value which is equal to the output voltage of integrator 103, the length of the pulse output from flip-flop 125 will be proportional to the time integral of the input power, i.e., the output of integrator 103 will be $V = PaT_1$ where Pa is the average power and $T_1$ the measurement time with $0 < T_1 \leq 15$ min. Integrator 121 will have an output $V = K_1 T_2$ where $K_1$ = the constant voltage and $T_2$ equals the length of the output pulse. Thus $P_A T_1 = K_1 T_2$ or $T_2 = P_A T_1/K_1$ and is proportional to the time integral of the power.

Figures 4, 7B, 7F:
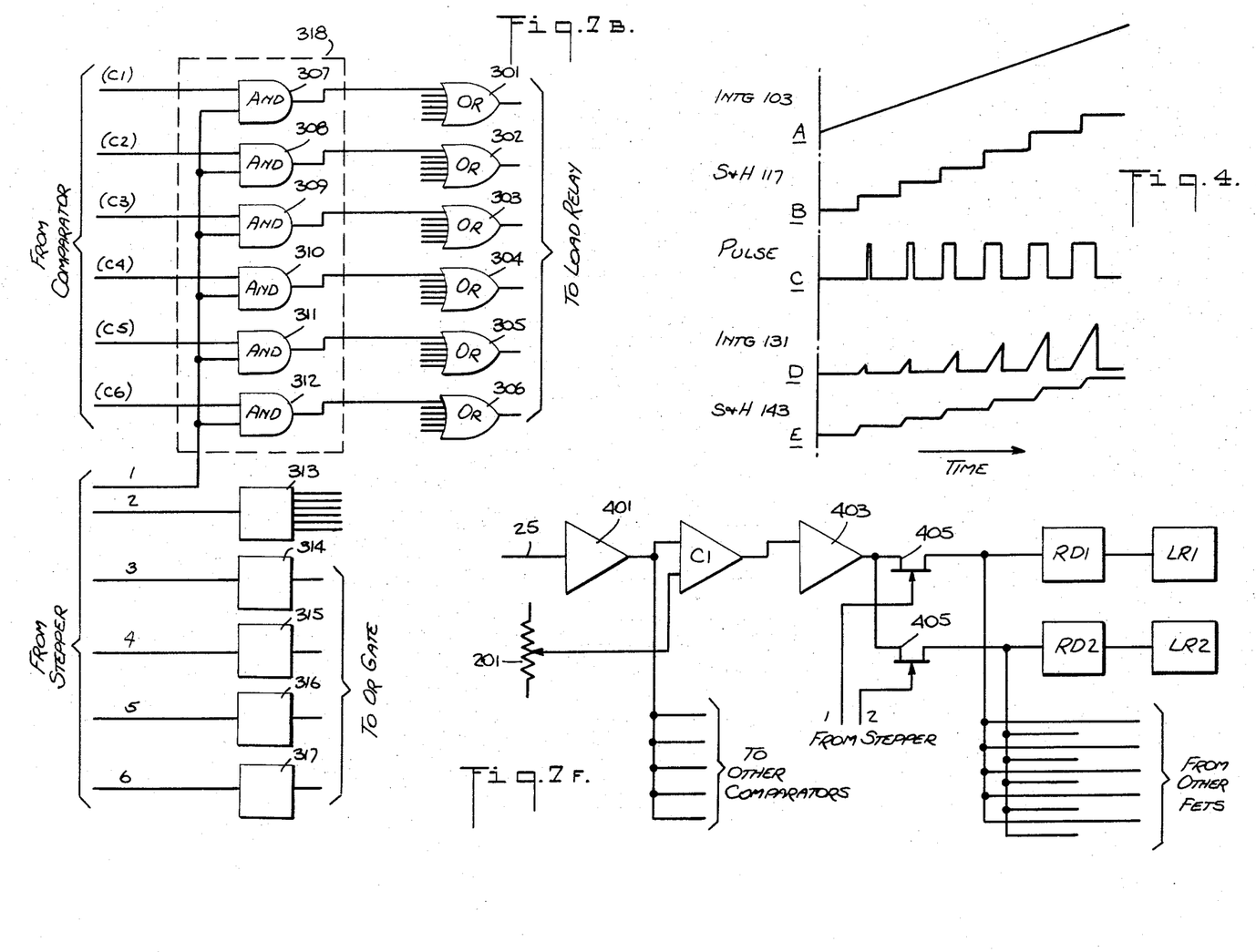
FIG. 4 represents the curves of the various output signals within the circuits of FIGS. 3 and 5.
FIGS. 7A through 7F are various embodiments for switching the loads through the set points during a predetermined time interval.

The type of signals appearing at various parts of the circuit of FIG. 3 are shown in FIG. 4. The first wave form a represents the output voltage of integrator 103 which is herein shown as a ramp (assuming a constant input power) but in actual practice will have variations in its slope as the input power changes. The next wave form B represents the output voltage of sample and hold circuit 117. Each time it samples the output of integrator 103 the output of circuit 117 increases and remains at that voltage until the next sample. The wave form shown at C represents the pulsed output from flip-flop 125. Each of the pulses has a length proportional to the amplitude of the ramp from integrator 103 at the time it was sampled and thus is proportional to the time integral of the power as described above.

As shown by the curves of FIG. 4, the pulse duration signal used to operate relay 22, increases over the 15 minute period. In the embodiment, this pulse appears every 10 seconds through the counter 113. At the end of the 15 minute cycle, counter 115 operates switch 109, capacitor 107 is discharged and the integration cycle repeats for a new 15 minute cycle. It will be recognized that a 15 minute cycle is used only as an example herein and that other cycle lengths may equally well be used.

The pulse output shown as C on FIG. 4 will be provided out of relay 22 to one or a plurality of transducers 24 as indicated on FIG. 2. This output may be fed directly over hard wires or may be used to modulate a carrier frequency signal superimposed over electrical distribution wires or transmitted in other conventional fashion. For example, it may be used to modulate a radio signal and transmitted to one or more receivers located at the loads. This manner of pulse length modulation facilitates such transmission and may be used in other types of systems such as demand systems in which loads are always dropped in the same sequence and not rotated as described herein. Similarly it may be used to provide remote indications of power demand.

Figure 5:
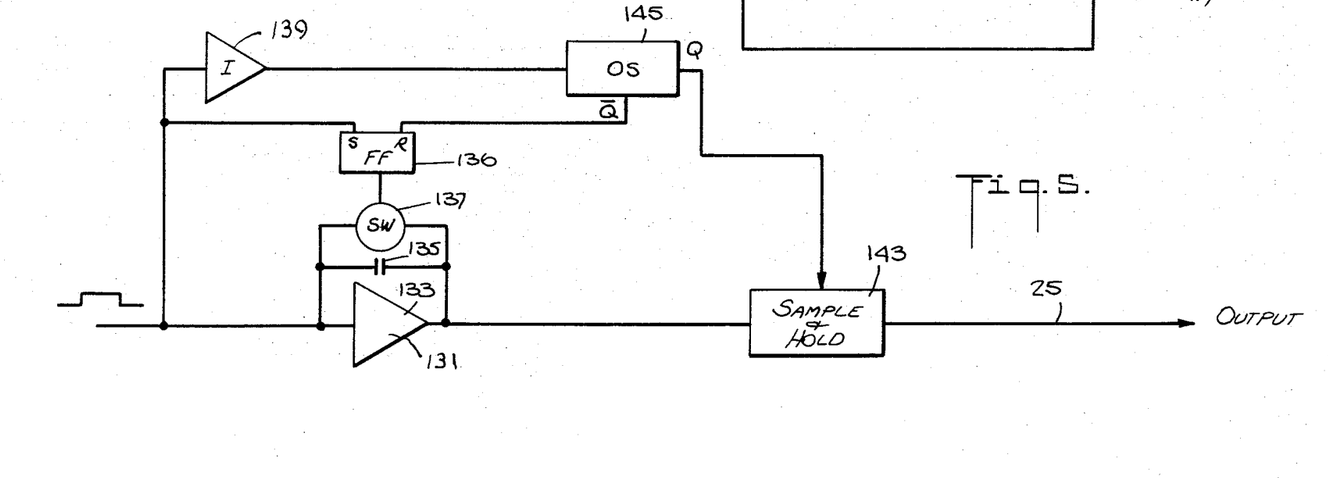
FIG. 5 is a block diagram of the second transducer circuit for transforming the pulse duration signal into a voltage signal whose magnitude is proportional to the integrated power demand of the loads.

A circuit which may be used for converting the pulse duration modulated output signal from the relay 22 of FIG. 2 into an analog voltage is shown in FIG. 5. the input pulse is fed to an integrator 131 comprising an amplifier 133 and a capacitor 135 in its feedback path. A switch for discharging the capacitor 135 is connected in parallel therewith. The input to integrator 131 is also fed to set a flip-flop 136, the output of which will cause switch 137 to open when the pulse occurs, thereby permitting integrator 131 to begin its integration. Because the pulsed output from the relay 22 will be a constant voltage, the output of integrator 131 will be equal to this constant voltage times the time of integration or demand period. The time in turn is determined by the duration or length of the input pulse. This means that the final output voltage of integrator 131 at the end of the input pulse will be a voltage whose magnitude is proportional to the duration or length of the pulse. As noted above, the length of the pulse is proportional to the time integral of the power and thus the final output voltage is also proportional thereto, i.e., $V_3 = T_2 K_2$ where $V_3$ is the output of integrator 131 and $K_2$ the constant pulse voltage. Since $T_2 = P_A T_1/K_1$, $V_3 = P_A T_1 K_2/K_1$ it is proportional to $P_2 T_1$.

The pulse is also provided through an inverter 139 to a one shot 145. On the falling edge of the pulse, one shot 145 will fire and its Q output will cause a sample and hold circuit 143 to begin sampling the output of integrator 131. At the end of the one shot pulse, sample and hold circuit 143 will be holding whatever value was present at the output of integrator 131 at the time. At the end of the one shot pulse, its $\overline{Q}$ output will reset flip-flop 136. This will close switch 137 discharging capacitor 135. The output of sample and hold circuit 143 is then the signal appearing on line 25 of FIG. 5.

The wave forms at various portions of this circuit are shown in FIG. 4 where, as shown, integrator 131 will integrate each pulse of increasingly longer duration for a longer period of time and thus attain a higher output voltage with each pulse. The sample and hold circuit 143 samples each of these outputs and has a step output voltage, which is the final transducer output, as shown in wave form E of FIG. 4.

Thus the pulse duration output signal of control relay 22 or other pulse forming means has a signal proportional to the power consumption of the installation. For example, this signal may be adjusted, as in the embodiment described above, on a scale of 0 to 10 seconds with 10 seconds representing 100 percent of the power demand limit. This pulse duration signal is converted within the second transducer 24 into a voltage signal, whose magnitude may vary for example from 0 to 10 volts.

In some instances, it may be more desirable to provide an output which represents the power lever demand averaged over a period from the beginning of the 15 minute period up to the time at which the measurement is being made. This type of measurement may be accomplished by utilizing a system by which the power demand is integrated during the demand period and periodically divided by the elapsed time to give a signal proportional to the instantaneous power demand up to the time of measurement. Such outputs allow an earlier prediction as to whether the load limit is to be exceeded.

Figure 6A:
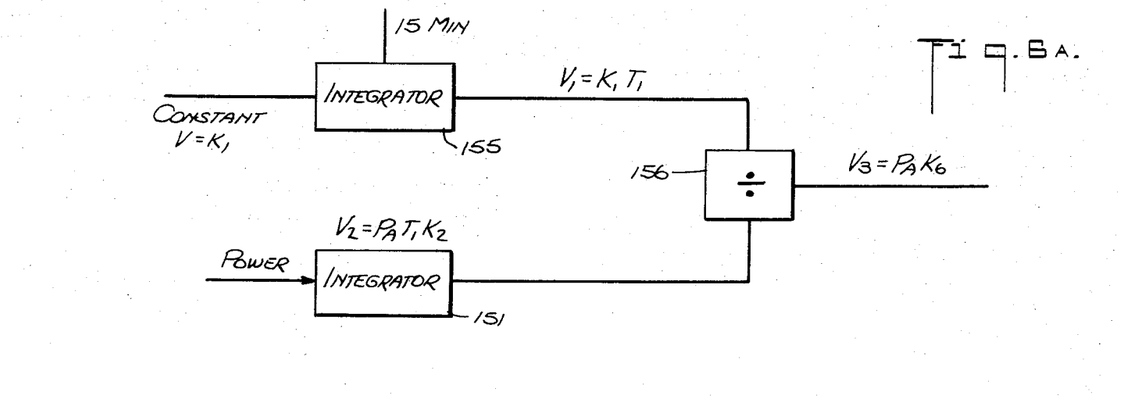
FIG. 6A is a circuit for determining the power demand averaged from the beginning of the time interval up to the time when the measurement is made.

One embodiment for producing such an output signal is shown in simplified form on FIG. 6A, it being understood that this embodiment is only intended to illustrate the invention and not intended to restrict the true scope of the invention. The power output will be integrated as described above in integrator 151. Also, as before, the output of integrator 151 will be sampled and held every 10 seconds by a sample and hold circuit 153. As indicated below block 151, its output voltage $V_2$ is equal to the average power $P_A$ times the time $T_1$, i.e., the time from the beginning of the period up to the time the measurement is made, times a constant $K_2$. A second integrator 155, essentially identical to the integrator 151, is also provided and has as its input a constant voltage $V$ equal to $K_1$. Thus, as indicated on FIG. 6A, the output voltage of integrator 155, $V_1$ will equal $K_1$ times $T_1$.

The voltage outputs of integrators 155 and 151 are fed to a divider 156 wherein the output of integrator 151 is divided by the output of integrator 155 to obtain a voltage $V_3 = P_A \times K_6$ where $K_6 = K_2/K_1$. Any commercial divider may be used and preferably will contain a sample and hold circuit so that a sampled output in the manner described below is provided. Alternatively a conventional divider module along with a separate sample and hold circuit may be used to output voltages at 10 second intervals as required.

Figure 6B:
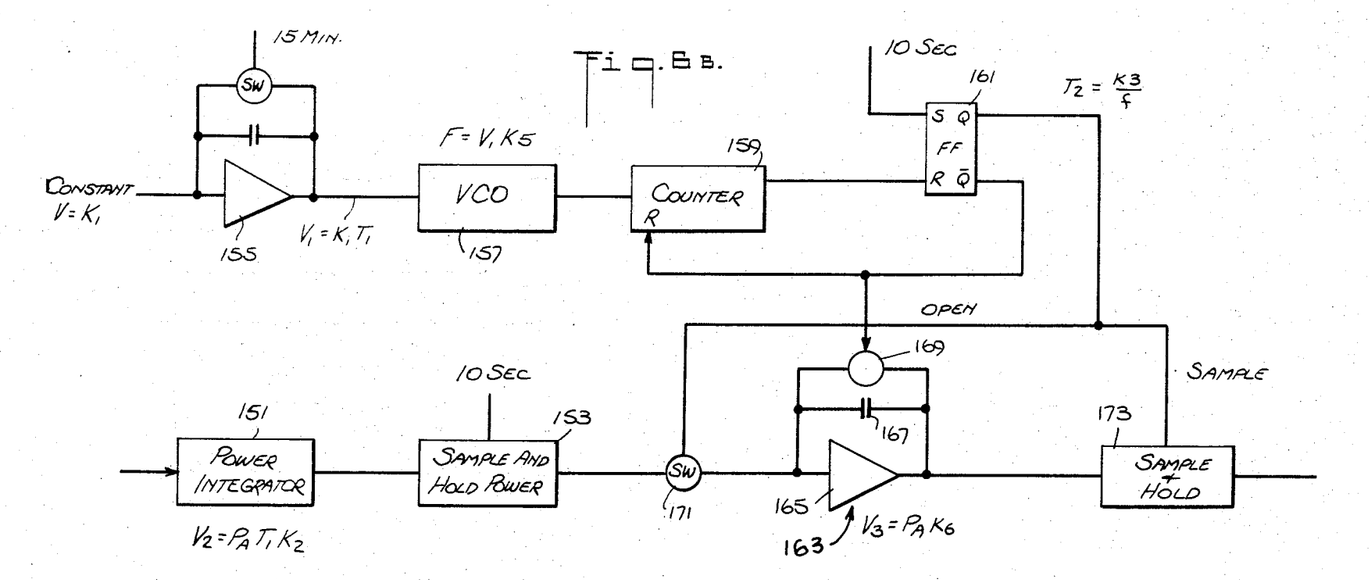
FIG. 6B is a more detailed schematic of the circuit of FIG. 6A.

An example of a type divider which may be used is shown on FIG. 6B. The output voltage of integrator 155 is used as an input to a voltage controlled oscillator 157 which will have a frequency output equal to its input voltage times a constant i.e., $f$ equals $V_1$ times $K_5$. The output of voltage controlled oscillator 157 is fed to a counter 159 which produces an output after $K_3$ counts. The output of counter 159 is fed as a reset input to a flip-flop circuit 161. In operation, flip-flop 161 is set by the output of counter 113 of FIG. 3 (i.e., every 10 sec.). The $\overline{Q}$ output of flip-flop 161 is fed as a reset input to counter 159 and as long as the flip-flop is reset and its $\overline{Q}$ output is a "1," counter 159 will be disabled from counting. When the 10 second pulse sets flip-flop 161, counter 159 begins counting the output pulses from the voltage controlled oscillator 157. It continues counting until it counts $K_3$ pulses at which time an output from the counter resets flip-flop 161 which in turn resets the counter and prevents it from counting more pulses. The time for flip-flop 161 to set is $T_2 = K_3/f$. That is, with a frequency output of $f$ pulses per second, it will take $T_2$ seconds to reach $K_3$ counts.

The output of flip-flop 161 is used to control the input to an integrator 163 comprising amplifier 165 having a capacitor 167 and switch 169 in its feedback path. The input to integrator 163 is fed from sample and hold circuit 153 through a switch 171. When the flip-flop 161 is set, switch 171 closes and switch 169 opens to permit integrator 163 to begin integrating. It integrates for the period $T_2$ at which time the outputs of flip-flop 161 are reset and its output opens switch 171 and closes switch 169 discharging capacitor 167 in preparation for the next integration period. An additional sample and hold circuit 173 is provided having as its sampling input the Q output of flip-flop 161. Thus, during the integration period it samples the output of integrator 163 and holds the value reached at the end of the integration. The output voltage of integrator 163 is equal to: $V_3 = V_2 \times T_2$. Substituting we have $V_3 = P_A T_1 (K_2K_3K_4/f)$ where $K_4$ is the constant of integrator 163. Substituting for $f$ we have: $V_3 = P_A T_1 (K_2K_3K_4/V_1K_5)$ and then substituting for $V$ we have: $V_3 = P_A(T_1 K_2K_3K_4/T_1K_1K_5)$ to end up with $V_3 = P_AK_6$ where $K_6 = K_2K_3K_4/K_1K_5$. Thus by adjusting the constants within the circuits an output voltage can be obtained proportionaly to the average demand at the time the measurement is made.

This voltage may then be converted to a pulse duration signal in the manner described above in connection with FIG. 3 to facilitate transmission. It will then be converted back to a voltage by a circuit such as that described above in connection with FIG. 5 as explained above.

The voltage output of the second transducer 24 of FIG. 2 can thus be a voltage representing the demand averaged over either a 15 minute interval or the time from the beginning of the interval to the time of the measurement.

Either voltage may then be fed to a plurality of set points within module 26, each set point representing a percentage of the permissible maximum demand. Thus set point number 27 may represent 0.82 or 82 percent of the permissible demand. Similarly, set point 28 may represent 0.84 or 84 percent of the permissible demand. These set points may increase at 0.02 intervals up to 0.96 or 96 percent of the permissible demand. Thus, load relay LR1 initially connected through logic circuitry 35 to set point 27 will be disconnected from the power bus when the power consumption of the system reaches 82 percent of the permissible demand for the system. Further, each of the set points 27-34 may be adjustable, for example, from 50-100 percent of the permissible demand.

Thus, in operation as each percentage increment up to 96 percent (or the system limit) is reached, the load relays LR1-LR8, for each of the loads 1 through 8, will be progressively operated, disconnecting the respective loads from the power supply.

Also connected to the logic circuitry 35 is a sequential programming circuit mounted within the second transducer 24. This timing sequence circuit connected through line 31, switches the position of the load relays LR1 through LR8 for example every 15 minutes. Thus LR1 is connected to set point 27 during the first 15 minute interval and therefore is the load which will be dropped first should the demand reach 0.82 percent of the peak demand. During the next 15 minute interval LR1 will be switched for example to set point 29. Therefore during this interval LR1 has the highest priority and remains connected to the power supply until 96 percent of the permissible demand is reached at which point it too will be shed. That is, load relay 1 during the second time interval would not be disconnected until 0.96 or 96 percent of the permissible demand has been reached. Similarly, for each 15 minute interval each relay is progressively and sequentially switched so that at the end of the 2-hour period 1 will have progressed through the entire sequence of set points and return to the 0.82 set point.

Figure 7A:
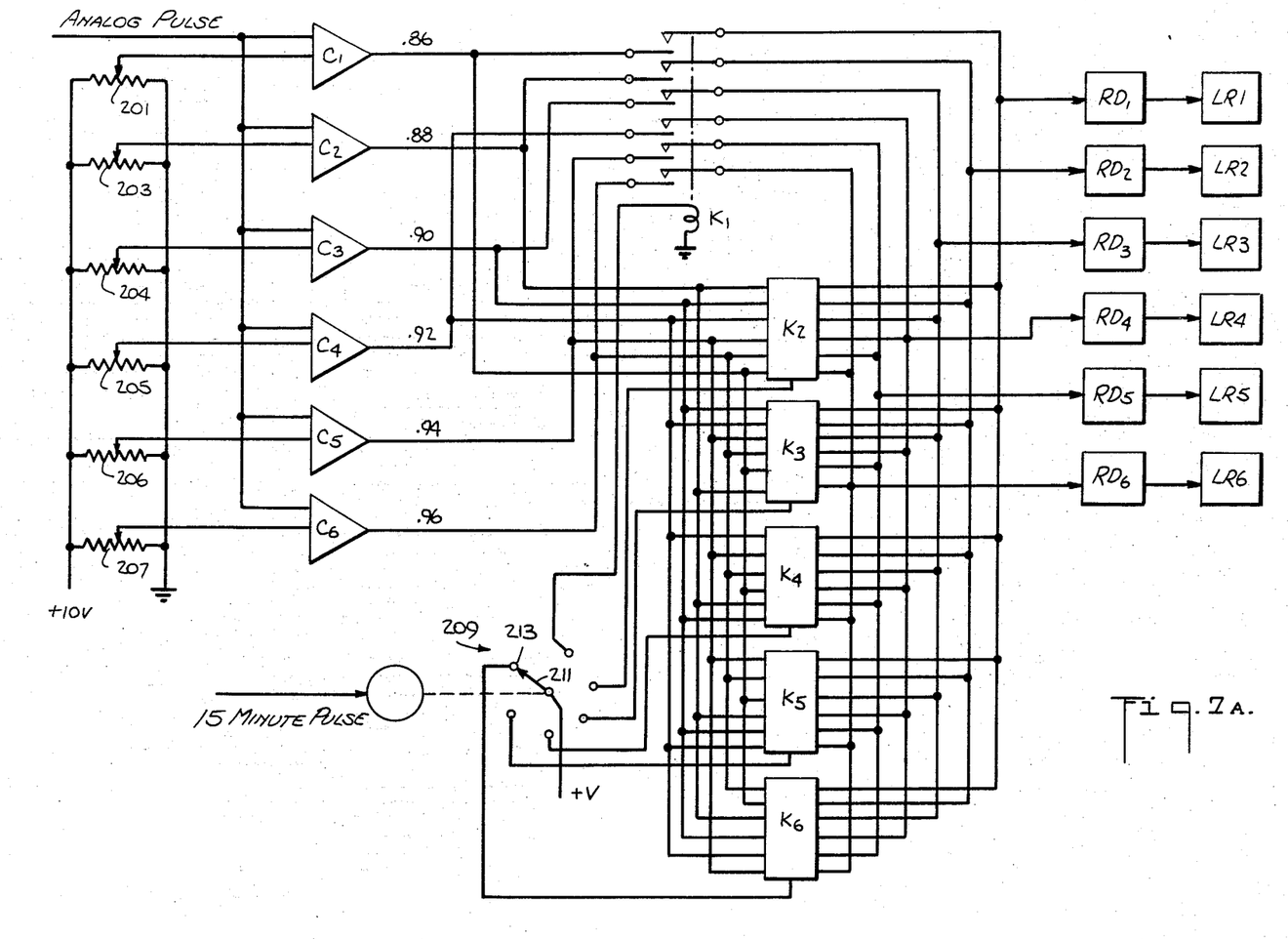

One method of accomplishing the sequential switching and comparing logic means of FIG. 2 is shown on FIG. 7a. On FIG. 2 the system is shown as controlling eight loads. It will be recognized that a smaller or larger number of loads may be controlled as desired. In describing the logic of FIGS. 7A, 7B, and 7C only six loads will be assumed to maintain simplicity. It will be evident to those skilled in the art that the same principles may be readily applied to six, eight or for that matter any desired number of loads. The analog pulse output from the second transducer 24, which, as noted above, will be proportional to the time integral of the power, is connected as one input to a plurality of comparators C1 through C6. Each of the comparators has a second input from a potentiometer. Thus, comparator C1 obtains its second input from a potentiometer 201, C2 obtains its second input from a potentiometer 203, C3 obtains its second input from a potentiometer 204, C4 obtains its second input from a potentiometer 205, C5 obtains its second input from a potentiometer 206 and comparator C6 obtains its second input from a potentiometer 207. Each of the potentiometers has 10 volts across it so that the input to the respective comparators may be varied between zero and ten volts. As an example, settings running from 8.6 to 9.6 with 0.2 volts difference between each comparator are shown in FIG. 7A. Each of the outputs from comparator C1 through C6 are connected to six different relays K1 through K6 of which K1 is shown in detail. The output of comparator C1 is connected to the first input contact of relay K1, the output of comparator C2 to the second input contact and so on. For relay K2 the output of comparator C2 is provided to the first input contact, the output of comparator C3 to the second and so on, with the output of comparator C1 provided to the last contact. Similarly, K3 will have as its first input the output of comparator C3 and as its last input the output of comparator C2. Relays K4 through K6 will be wired in similar manner so that, by sequentially energizing the relays, the inputs from comparators C1 through C6 will appear on different outputs. Each of the first output terminals of relays K1 through K6 are connected together and fed through a relay drivers $RD_1$ through $RD_6$, which may be another relay or a power transistor stage, wherein the relatively low power output from the comparator is amplified to provide sufficient power to drive the load relay LR1, while each of the second outputs are connected together and fed to load relay LR2 and so on.

The relay coils of relays K1 through K6 are energized by outputs of a stepper switch indicated generally as 209. Stepper switch 209, for the embodiment illustrated, will have six positions. Each time a 15 minute pulse is received by the stepper switch its wiper 211 will advance one position. The wiper is connected to a positive voltage of sufficient magnitude to energize the relays. In the position shown, the wiper at terminal 213 provides the energizing input to relay K6. Thus in this position, the output of comparator C1 will be connected to LR2, that of comparator C2 to LR3 and so on with the output of comparator C6 coupled to LR1. During each succeeding step of stepper 209, the sequence will be changed so that for each 15 minute period a different one of the load relays will be the first load disconnected when the power demand exceeds the 0.86 value set at potentiometer 201. In operation, when the analog pulse exceeds 0.86 i.e., exceeds 8.6 volts, comparator C1 will produce an output which will be connected through one of the relays K1 through K6 to provide a pulse which will operate one of the relays LR1–LR6 to which it is coupled, and drop that load from the circuit. Similarly if the amplitude of the analog pulse is greater than 8.8 volts comparator C2 will provide an output through one of the relays to cause a second load to be dropped. The important thing to note is that because of the sequencing, the load which is first dropped i.e., when the 8.6 volt level is exceeded, and the subsequent load to be dropped when the other preset limits are exceeded, will be different for each succeeding 15 minute period.

When in the averaged mode of operation with the embodiment of FIG. 6, one or more of the comparators C1–C6 may have its limit exceeded by the output signal causing associated load relay or relays (LR1–LR6) to be energized to drop the required loads. On a subsequent measurement the averaged output can drop below the limit in which case the loads should be reconnected. However, it is possible that the DC output voltage will vary around a set point and an oscillatory switching in and out could occur. Thus means are provided to delay the deenergizing of the load relays in response to the comparator output changing when a new averaged value drops below a previous higher value.

Figures 7C, 7D, 7E:
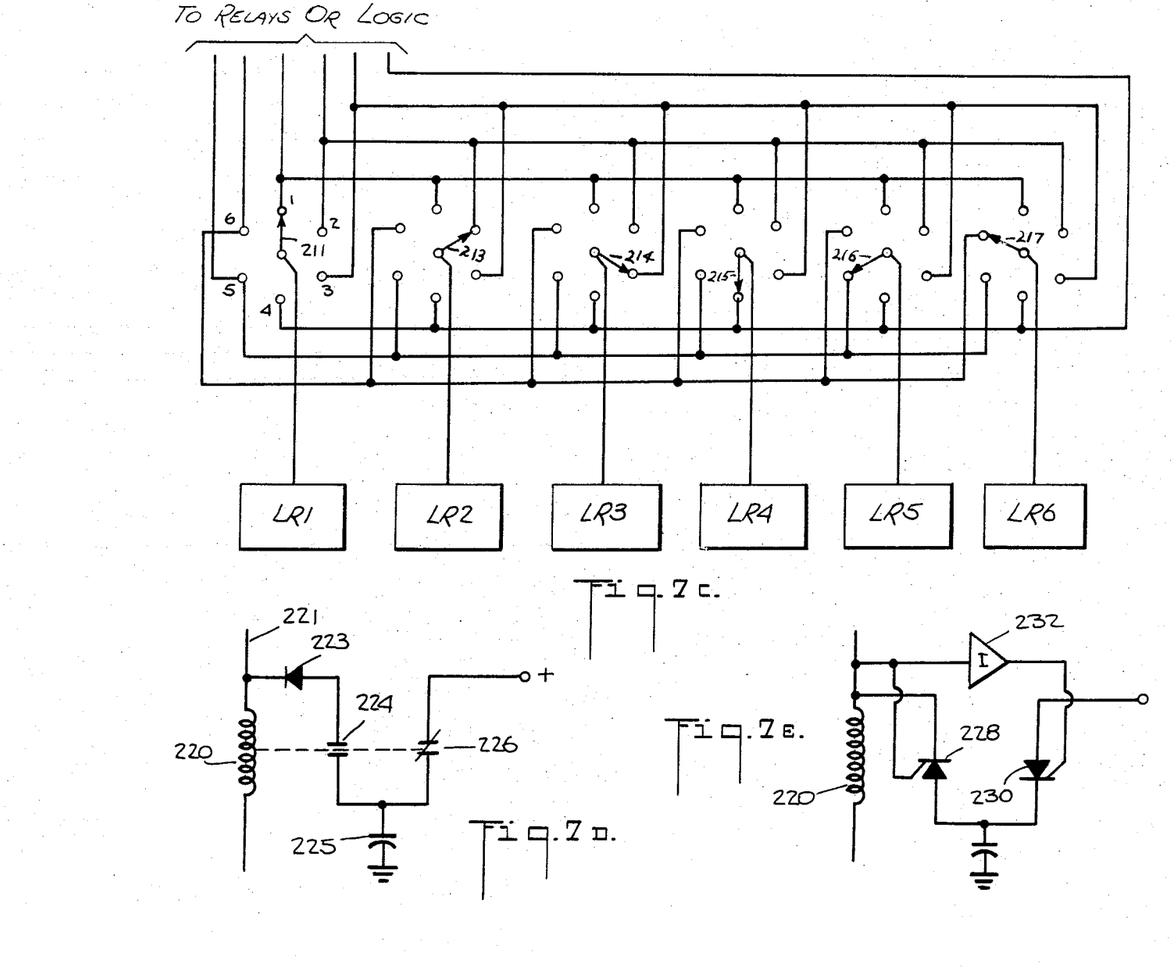

An example of how this delay may be accomplished is illustrated in FIGS. 7D and 7E. In FIG. 7D the load relay coil 220 is connected between an input line 221 from the logic circuits described above and ground. An output from its associated comparator will energize the relay coil 220 as described above. Also connected to line 221 is a diode 223 having its other end connected through a set of relay contacts 224 to a capacitor 225 which has its other side grounded. Capacitor 225 is also connected through an opposite set of contacts 226 to a positive voltage. When the coil is de-energized, contacts 226 are closed and the capacitor charges. Upon energization, contacts 226 open and contacts 224 close. The capacitor 225 remains charged since the voltage on line 221 equals that at the capacitor. If the voltage on line 221 now is removed in response to a new measurement output, the capacitor voltage will keep the relay from immediately de-energizing. The amount of delay may be adjusted knowing the hold-in voltage of the relay, by varying the RC time constant of capacitor 225 and coil 220.

The embodiment of FIG. 7E works in similar fashion with the contacts 224 and 226 replaced by solid state devices such as SCRs 228 and 230. With no input on line 221, SCR 230 will be turned on by an output from an inverter 232 having line 221 as an input and will permit capacitor 225 to charge. SCR 228 will remain off and the relay will not energize. An input on line 221 will energize the relay and will open SCR 228 and close SCR 230. As in the previous embodiment, the capacitor will remain charged. If the voltage on line 221 is removed, the capacitor 225 will hold the relay on in the same manner as described above for a preset delay period.

When in the mode of operation illustrated by FIG. 3, 4 and 5, at the end of the measurement period the DC voltage to the comparators is reset to zero as described above. This will cause any of the load relays which were energized during the previous measurement period to be de-energized to reconnect their loads. The delay circuits described above may be used here also. In particular, varied delays may be used in the different relays to avoid reconnecting all at once to avoid a power surge.

The relay logic of FIG. 7A can of course be replaced by solid state logic, an example of which is shown in FIG. 7B. For each of the positions of stepper 209, a plurality of AND gates are provided. These AND gates are designated by the blocks 318, 313, 314, 315, 316 and 317 of which the plurality of AND gates in block 318 is shown in detail. In each of the gating blocks, each AND gate in the block has as an enabling input one of the outputs of stepper switch 209 of FIG. 7A. Thus as shown, AND gates 307 through 312 all have as one input a voltage from the first position of stepper switch 209 i.e., the one which goes to K1 of FIG. 7A. As their second input the gates have the respective outputs of the comparators C1 through C6. Thus AND gate 307 has as its second input the output of comparator C1, AND gate 308, the output of comparator C2 and so on. In the gating module 313 the first AND gate would have as an input the output of comparator C2, the second gate the output of comparator C3 and so on with the sixth gate having the output of C1 as an input. Similarly gates 314 through 317 would have successive comparator outputs provided to their AND gates in the same manner as inputs were provided to the relays of FIG. 7A. The output of AND gate 307 and the output of the first gate in each of the modules 313 through 317 are provided as inputs to an OR gate 301 which has its output connected to load relay LR1. Similarly all the second gate outputs are connected to OR gate 302, all the third gate outputs to OR gate 303 and so on. Thus, when a comparator provides an output pulse when the voltage set at its respective potentiometer is exceeded, this pulse will be connected to one AND gate in each of the gate modules 318, 313, 314, 315, 316 and 317. However, only one of the sets of gates will be enabled by an output from stepper 209. Assume that an output is provided from comparator C1 indicating that the 0.86 demand limit has been exceeded. This output will be provided to the first AND gate in block 318 i.e., AND gate 307, to the second AND gate in block 313, to the third AND gate in block 314 and so on. Assume also that the stepper is at the first position. AND gate 317 will then be enabled and provide an output to OR gate 301 which will in turn provide an output to relay LR1. If the stepper is in the position shown, i.e., the sixth position, the gates in block 317 will be enabled. The output of comparator C1 will be connected to the second gate in block 317 and thus an output to OR gate 302 will occur causing load relay LR2 to be dropped. Thus, for each successive 15 minute period, the sequence in which the six loads are dropped will be changed.

FIG. 7F shows in further detail a preferred embodiment constructed along the lines of FIG. 7B. Only a small portion of the total system is shown for purposes of maintaining simplicity. As shown a buffer amplifier 401 is provided between the input signal from line 25 and the comparator C1. A line from this buffer amplifier is similarly provided to the other comparators as indicated. In addition, to avoid loading of the comparators, a buffer amplifier 403 is provided at their outputs. In place of the AND gates of FIG. 7B semiconductor switches may be used. Particularly useful are FET switches which will have their source tied to the amplifier output, their drain to a respective relay driver and their gate to the stepper switch output. Thus, there is shown on FIG. 7F two FET switches 405 connected to the output of the amplifier 403, only two switches are shown for purposes of simplicity. In the embodiment each of the comparators C1–C6 will have FET switches 405 connected to the output of its associated amplifier 403 which in turn are connected to the respective relay drivers. Each of the relay drivers will have, as indicated by the lines tied together, inputs from an assoicated FET for each of the 6 comparators. i.e., in essence each of the AND gates of FIG. 7B is replaced by a FET switch with the gate signal input providing the enabling input, and the source input, the signal input. The OR gates shown on FIG. 7B are replaced by hard wiring as shown on FIG. 7F.

A further embodiment of the sequential logic is shown in FIG. 7C. In this embodiment a stepper switch with six separate sets of contacts A through F and six wipers is provided. The wipers are arranged so that when wiper 211 is in the 1 position, wiper 213 will be in the 2 position, wiper 214 in the 3 position, wiper 215 in the 4 position, wiper 216 in the 5 position and wiper 217 in the 6 position. The output of comparator C1 is tied to all of the 1 positions on the six sets of contacts, the output of comparatos C2 to all of the 2 positions, and so on. The wiper 211 is coupled to LR1, the wiper 213 to LR2, and so on. Thus, in the position shown, comparator C1 will be connected to operate LR1, comparator C2 to operate LR2, and so on. When a drive pulse is received advancing the stepper switch, each of the wipers will advance one step so that the ouput of comparator C2 is connected to the relay LR1, that of C3 to the relay LR2 and so on with C1 connected to the load relay LR6. Thus, with each step of the stepper switch the sequence in which loads are dropped will be changed.

Thus, by the operation of the demand limiting system described herein, a multiple load, power consuming installation can be provided in which the power consumption of the system is held below the maximum permissible demand selected for the system. By this invention a programmed shedding of the loads is always provided through a plurality of adjustable set points to insure that the maximum permissible demand is never exceeded. Further through the sequential changing of the various loads, each load in the system is switched through each of the set points so that over a predetermined period of time no one load will be continuously disconnected at the same power demand point. By the apparatus and method of this invention, therefore, each load over the predetermined time period shares equally in the possibility of disconnection from the power supply. Further, through the adjustability of the set points the conditions for connecting and disconnecting each load from the power source may be varied within the parameters required for any installation.

Thus, by my invention it is possible to determine the power demand within a demand period and utilize this determinatioon to provide load shedding without determining in advance the priority of each of the respective loads. The determination of whether or not each load is to remain connected is done during a given demand period in which loads disconnected, if required, during the prior demand period will have a greater opportunity to remain connected during the given demand period.

In the foregoing, the invention has been described in reference to specific exemplary embodiments. It will be evident, however, that variations and modifications, as well as the substitution of equivalent constructions and arrangements for those shown for illustration, may be made without departing from the broader scope and spirit of the invention as set forth in the appended claims. The specification and drawings are accordingly to be regarded in an illustrative rather than in a restrictive sense.

What is claimed is:

1. An electrical demand limiting system for limiting the load demand of multiple loads during a demand period, the demand period being a period of time over which power demand is measured for billing purposes, comprising:

means, responsive to the power consumption of the loads for producing an output signal proportional to an integrated power demand of the loads during the demand period;

means, responsive to said output signal, for disconecting said loads from the power system when the power demand exceeds predetermined adjustable percentages of the permissible demand limit, said means including means for presetting a plurality of predetermined adjustable percentage set points; and means coupling the loads to the predetermined adjustable percentage set points for sequentially switching, over a predetermined time period, each of the loads to each of the predetermined adjustable percentage set points.

2. An electrical demand limiting system as in claim 1 wherein the means for producing an output signal proportional to the integrated electrical power demand comprises means for continuously measuring the instantaneous power demand over a predetermined time period; and means, responsive to the measured power demand, for producing an output signal proportional to the integrated power demand over the predetermined time period.

3. An electrical demand limiting system as in claim 2 wherein the means for disconnecting said loads comprises a plurality of adjustable comparison means responsive to the output signal proportional to the integrated power demand, each of said comparison means comparing integrated power demand with the adjustable percentage of the power demand limit, each comparison means producing an output signal when the integrated power demand exceeds its associated adjustable percentage of the power demand; and means responsive to the output of each comparison means for disconnecting at least one load when the integrated power demand exceeds its associated predetermined adjustable set point.

4. An electrical demand limiting system as in claim 3 wherein the output signal proportional to the integrated power demand comprises an electrical signal whose magnitude is proportional to the integrated power demand, the signal being compared in each of the comparison means to individual adjustable signals each proportional to a percentage of the integrated power demand and each of the loads being connected to the output of one of the comparison means through a disconnect means responsive to the output of its associated comparison means to disconnect a load when the integrated power demand exceeds its adjustable signal.

5. An electrical demand limiting system as in claim 4 wherein the means for sequentially switching the loads comprises means for periodically producing an output signal after a predetermined time interval; and switching means, responsive to the periodic signal, for sequentially switching each multiple load to a different comparison means in response to the periodic signal.

6. An electrical demand limiting system as in claim 5 wherein said switching means comprises:
means providing a plurality of sequential outputs such that only one is present at one time in response to said periodic signal; and
means having as inputs the outputs of said comparison means and responsive to said plurality of sequential outputs to connect its inputs to different outputs in response to each of said sequential outputs.

7. An electrical demand limiting system as in claim 6 wherein said means providing a plurality of sequential outpus comprises a stepper switch.

8. The invention according to claim 6 wherein said means for providing a plurality of outputs comprises a stepper switch and said means having as inputs the output of said comparison means comprise a plurality of semi-conductor switches.

9. An electrical demand limiting system for limiting the load demand of multiple loads during a demand period comprising:
a power transducer, responsive to the power consumption of the loads, for producing a continuous signal proportional to the instantaneous power demand of the loads;
means, responsive to the continuous signal, to periodically produce a pulse output signal having a time duration proportional to an integrated power demand of the loads during a predetermined time interval;
means, responsive to the pulse output signal, for periodically producing a voltage signal proportional to the integrated power demand of the loads during the predetermined time interval;
means producing a plurality of output signals, each of said signals proportional to a predetermined variable percentage of the permissible power demand;
a plurality of means for comparing the voltage signal proportional to the integrated power demand with the plurality of signals proportional to a predetermined variable percentage of the permissible power demand, each of said comparing means producing an output signal when the integrated power demand exceeds its associated predetermined percentage of the power demand;
a plurality of means, responsive to the output signals of said comparing means, for disconnecting the loads; and
means, coupling the comparing means to the disconnecting means, for sequentially connecting over a predetermined time period the outputs of each of the comparing means to the input of each of the disconnecting means so that each load over a given time period is progressively connected to each of the comparing means.

10. An electrical demand limiting system as in claim 9 wherein the means to produce a pulse output signal comprises:
an integrator for integrating the signal proportional to the instantaneous power demand over a predetermined time period;
means for generating periodic timing signals;
means, responsive to the timing signals, for periodically sampling and holding the integral of the instantaneous power demand; and
means, having as an input the output of the sample and hold means and responsive to the timing signals, for generating the pulse output signal, the duration of which is proportional to the magnitude of the integrated power demand occurring from the beginning of the predetermined time period up to the time of the sampling.

11. An electrical demand limiting system as in claim 9 wherein the means for producing a voltage signal proportional to the integrated power demand, comprises:
an integration means, responsive to the pulse output signal, having its operating period controlled by the duration of said pulse output signal;
a sample and hold means coupled to the output of the integration means, for sampling and holding the output of the integration means, said sample and hold means providing an output proportional to the output of said integration means at the time of sampling; and
means, responsive to the termination of said pulse output signal for causing said sample and hold means to sample said intergration means to produce the voltage signal proportional to the integrated power demand of the loads during the predetermined time interval.

12. An electrical demand limiting system for limiting the load demand of multiple loads during a demand period comprising:
   means, responsive to the power consumption of the loads, for producing an output signal proportional to the averaged electrical power demand of the loads from the beginning of the demand period;
   means providing predetermined adjustable percentage set points of the demand;
   means, responsive to the averaged electrical power demand signal, for disconnecting loads when the power demand exceeds the predetermined adjustable percentage set points; and
   means, coupling the loads to the predetermined adjustable percentage set points, for sequentially switching, over a predetermined time period, each of the loads to each of the predetermined adjustable percentage set points.

13. An electrical demand limiting system as in claim 12 and furthr including means for reconnecting said loads when the averaged electrical power demand drops below said predetermined adjustable percentage set points.

14. An electrical demand limiting system as in claim 12 wherein the means for producing an output signal proportional to the averaged electrical power demand comprises:
   means for measuring the integral of the instantaneous power demand from the beginning of the demand period and for providing an output proportional thereto;
   means for developing a signal proportional to the time from the beginning of the demand period; and
   means for dividing said output proportional to the integral of the instantaneous power demand by said signal proportional to the time to obtain an output signal proportional to said averaged power demand.

15. An electrical demand limiting system as in claim 14 wherein said means for providing an output proportional to said integral of the instantaneous power demand comprises:
   a power transducer for producing a continuous DC signal proportional to the instantaneous power demand of the loads; and
   a first integrator having said DC signal as an input and providing an output which is the integral of the instantaneous power demand;
   and wherein said means for developing a signal proportional to time comprises a second integrator having a constant DC voltage as its input and providing an output voltage.

16. An electrical demand limiting system as in claim 15 wherein said means to divide comprises:
   a third integrator;
   means to convert the output of said second integrator to a timed pulse of a length inversely proportional to the output voltage of said second integrator; and
   means responsive to said timed pulse to couple the output of said first integrator to the input of said third integrator for the duration of said pulse.

17. An electrical demand limiting system as in claim 16 wherein said means to convert said second integrator output comprises:
   a voltage controlled oscillator having the output of said second integrator as an input and providing as an output a frequency proportional to its input voltage;
   a digital counter of predetermined modulus having the output of said oscillator as a count input;
   a bistable device having complementary Q and $\overline{Q}$ outputs and having at least a set and a reset input with its $\overline{Q}$ output coupled to hold said counter reset when said bistable device is reset and the reset input of the device coupled to the output of said counter with the Q output of said device providing said timed pulse; and
   means coupled to the set input of said bistable device to initiate a division by setting said device.

18. An electrical demand limiting system as in claim 17 wherein said first integrator, has its output coupled through a first sample and hold circuit adapted to sample and hold the output of said first integrator in response to the setting of said bistable device and wherein a second sample and hold circuit is coupled to the output of said third integrator, said second sample and hold circuit adapted to sample and hold the output present at said third integrator at the end of said timed pulse and further including means to reset said third integrator at the end of said timed pulse.

19. Apparatus for providing a pulse duration siganl proportional to an integrated power demand of a load comprising:
   a. means responsive to the power consumption of the load for continuously measuring the power demand over a time period;
   b. means responsive to the measured power demand for producing an output signal the magnitude of which is proportional to integrated power demand over the time period; and
   c. means converting said output signal to a pulse output signal having a time duration proportional to the integrated power demand over the time period.

20. The invention according to claim 19 in combination with means to transmit said pulse output signal to a remote location.

21. The invention according to claim 20 in combination with means for receiving said pulse output signal and converting said signal to a voltage proportional to said integrated power demand.

22. The invention according to claim 21 wherein said means for receiving said pulse output signal and converting said signal to a voltage proportional to said integrated power demand is comprised of:
   an integration means, responsive to the pulse output signal, having its operating period controlled by the duration of said pulse output signal;
   a sample and hold means coupled to the output of the integration means, for sampling and holding the output of the integration means, said sample and hold means providing an output proportional to the output of said integration means at the time of sampling; and
   means, responsive to the termination of said pulse output signal for causing said sample and hold means to sample said integrating means to produce the voltage signal proportional to the integrated power demand of the loads during the predetermined time interval.

23. The invention according to claim 19 wherein the means for producing an output signal the magnitdue of which is proportional to the integrated power demand over the time period and converting said output signal to a pulse signal comprises:
- an integrator for integrating the measured power demand, the integrator being controlled to integrate the measured power demand during a predetermined time period;
- means, for generating periodic timing signals;
- means, responsive to the timing signals, for periodically sampling and holding the integral of the measured power demand; and
- means, having as an input the output of the sample and hold means and responsive to the timing signals, for generating a pulse signal, the duration of which is proportional to the magnitude of the integrated power demand occurring from the beginning of the predetermined time period up to the time of the sampling.

24. Means for developing an output signal which is proportional to the average electrical power demand of a load comprising:
a. a power transducer responsive to power consumption of the load for producing a continuous signal proportional to the instantaneous power demand of the load;
b. means for computing the integral of the instantaneous power demand from the beginning of a demand period and providing an output signal proportional thereto;
c. means developing a signal proportional to the time from the beginning of the demand period; and
d. means dividing said signal proportional to the integral of the instantaneous power demand by said signal proportional to the time to obtain an output signal proportional to said average power demand.

25. The invention according to claim 24 and further including means for converting said signal proportional to the average power demand to a pulse duration signal.

26. The invention according to claim 25 in combination with means to transmit said pulse duration signal to a remote location.

27. The invention according to claim 25 further comprising:
means providing predetermined adjustable set points;
a plurality of loads;
means, responsive to said pulse duration signal, for disconnecting a load when the power demand exceeds said predetermined adjustable set points, said set points representing predetermined adjustable percentages of the demand.

28. The invention according to claim 27 and further including means for sequentially switching over a predetermined time period each of the loads to each of the predetermined adjustable set points.

29. The invention according to claim 23 in combination with means to receive said pulse duration signal and convert said signal to a voltage.

* * * * *